United States Patent [19]

Tufano et al.

[11] Patent Number: 4,933,778
[45] Date of Patent: Jun. 12, 1990

[54] CALIBRATION OF PLATEN REGISTRATION EDGES IN COPIERS

[75] Inventors: Charles M. Tufano, Rochester; Edward M. Kelly, Penfield; Lawrence B. Telle, Rochester, all of N.Y.

[73] Assignee: Eastman Kodak Company, Rochester, N.Y.

[21] Appl. No.: 245,594

[22] Filed: Sep. 19, 1988

[51] Int. Cl.$^5$ .......................................... G03G 21/00
[52] U.S. Cl. ...................................... 358/488; 355/75; 355/230; 355/233
[58] Field of Search ................ 355/230, 231, 75, 317, 355/233; 271/226, 227, 228; 358/488, 496, 497

[56] References Cited

U.S. PATENT DOCUMENTS

| | | | |
|---|---|---|---|
| 3,904,290 | 9/1975 | Kodd et al. | 355/8 |
| 3,992,108 | 11/1976 | Kidd et al. | 356/172 |
| 4,005,940 | 2/1977 | Kidd et al. | 356/172 |
| 4,304,486 | 12/1981 | Cormier et al. | 355/317 X |
| 4,338,020 | 7/1982 | Yukawa et al. | 355/41 |
| 4,391,505 | 7/1983 | Silverberg | 355/75 X |
| 4,433,909 | 2/1984 | Goes In Center et al. | 355/75 |
| 4,478,405 | 10/1984 | Eertink et al. | 271/227 |
| 4,505,574 | 3/1985 | Kurata et al. | 355/14 |
| 4,538,905 | 9/1985 | Griego et al. | 355/14 SH |
| 4,707,117 | 11/1987 | Takenaka et al. | 355/230 X |
| 4,713,550 | 12/1987 | Anzai et al. | 250/560 |
| 4,749,872 | 6/1988 | Asada et al. | 355/75 X |

Primary Examiner—A. T. Grimley
Assistant Examiner—Robert Beatty
Attorney, Agent, or Firm—J. R. Hanway

[57] ABSTRACT

An electrophotographic copies having a document scanner which determines the location of registration marks on the platen. The scanner is initially operated in a calibration mode without a document on the platen. The platen is scanned and the data obtained is processed to determine when transitions from low to high density occur. These occurrences are translated to scanner locations to obtain the locations of the edges of the registration marks or guides, and the locations are stored in memory. In subsequent scannings of documents, only data within the determined locations of the registration edges is stored in memory.

16 Claims, 2 Drawing Sheets

FIG. 3

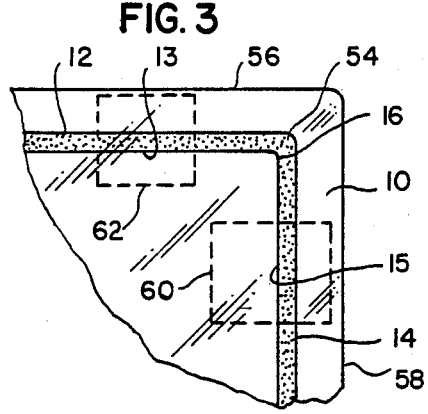

FIG. 4

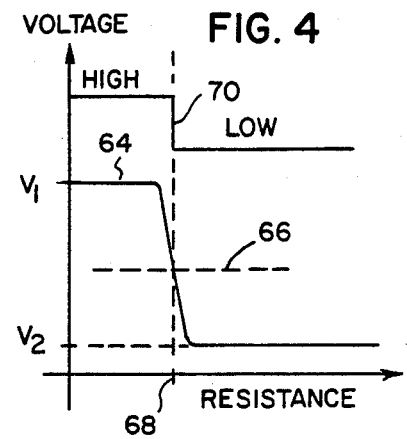

FIG. 5

- START — 72
- ACTIVATE SCANNER MOTION — 74
- TRANSITION FROM LOW TO HIGH DENSITY LINE SCAN? — 76 (NO loops back)
- YES → STORE LOCATION IN MEMORY — 78
- TRANSITION FROM LOW TO HIGH DENSITY PIXEL SCAN — 80 (NO loops back)
- YES → STORE LOCATION IN MEMORY — 82
- END — 84

FIG. 6

- START — 86
- ACTIVATE SCANNER MOTION — 88
- STORED MEMORY LOCATIONS REACHED? — 90 (NO loops back)
- YES → STORE SCANNED LINES IN MEMORY — 92
- SCAN COMPLETE? — 94 (NO loops back)
- YES → END — 96

CALIBRATION OF PLATEN REGISTRATION EDGES IN COPIERS

BACKGROUND OF THE INVENTION

1. Field of the Invention

This invention relates, in general, to an electrophotographic copying apparatus and, more specifically, to calibration of the crosstrack and intrack platen registration edges in copiers equipped with digital scanners.

2. Description of the Prior Art

Electrophotographic copying apparatus, machines, or devices which store digital signals of the original document into memory have a scanner for digitizing the document image. Considerable random access memory is required to store the digital data for an entire page and, in some applications, several pages of a multipage original document must be stored. Because of these large memory requirements, it is desirable to store into memory only data which is needed to reproduce or duplicate the original document.

The memory requirements have, according to the prior art, been maintained at a minimum level by storing only the scanned area occupied by the document page. However, this necessitates the accurate positioning of the document page in the scanner. Most scanners have a transparent platen onto which the document is placed, manually or automatically, for scanning. Registration marks, lines, or guides are located on the platen to allow for positioning of the document in the platen area which will be scanned. By keeping the document properly aligned on the platen, and by scanning only the area within the registration marks, redundant data is kept from occupying valuable memory space.

The difficulty with such registration marks is that the scanning system must know exactly where these marks are located on the platen to conserve memory and to accurately reproduce the original properly centered on the copy paper. Once the location is determined, any change in platen position, scanning head alignment, illumination source orientation, etc., can change the location as seen by the scanner. Many times these devices are moved or changed during a service routine, and recalibration is necessary.

Therefore, it is desirable and it is an object of this invention to provide a system for easily determining the location of registration marks or guides on the platen of copying and duplicating apparatus. Further objects of the invention are to require the location process only once unless the relative position of the marks changes, and to utilize the determined location to avoid storing data into memory which does not represent the original document.

SUMMARY OF THE INVENTION

There is disclosed herein a new and useful system for calibrating the location of the registration marks or guides on the platen of an electrophotographic copier or duplicator having a document scanner. The edges of the registration marks are located by operating the scanner initially in a calibration mode. Once determined, the edge locations of the two registration marks are stored in memory. Subsequent scannings of actual document pages disregards digitized data until the scanner is obtaining data from within the locations of the registration edges which are stored in memory. Once scanning occurs within the registration edges, the data obtained is stored in memory for further processing and/or printing.

During the calibration mode, the platen is scanned without a document in place but with the permanent, light colored, registration marks or guides positioned thereon. The data obtained starts before the registration edges and is stored in memory until after the registration edges are passed. Processing the data, which is related to the physical position of the scan line, provides the location of the registration edges within the stored calibration data. The intrack registration edge is determined by recognizing a transition from low to high density across substantially the entire scanning line. This transition is equated to scan line location and stored in non-volatile memory. The crosstrack registration edge is determined by recognizing a sustained transition from low to high density among the pixels of a scanned line. This transition is also converted to location and stored in memory. The stored registration edge locations define the area within which the scanner will store digital data on subsequent scans of document pages.

The new and novel platen calibration system disclosed herein is very useful when any component in the scanning system has been moved during repair, replacement, operation, or at any other time. The procedure requires no additional hardware or special alignment tools and is accomplished quickly by service or factory personnel. Once calibrated and stored in memory, the procedure does not need to be repeated until any of the scanning components are physically moved from their previous position.

BRIEF DESCRIPTION OF THE DRAWINGS

Further advantages and uses of this invention will become more apparent when considered in view of the following detailed description and drawings, in which:

FIG. 3 is an enlarged partial view of the platen shown in FIG. 2;

FIG. 4 is a graph illustrating the operation of the thresholder shown in FIG. 2;

FIG. 5 is a flow chart of an algorithm used to perform the calibration process; and FIG. 6 is a flow chart of an algorithm used to scan a document by using the data obtained when the algorithm shown in FIG. 5 is executed.

DESCRIPTION OF THE PREFERRED EMBODIMENTS

Figure 1:
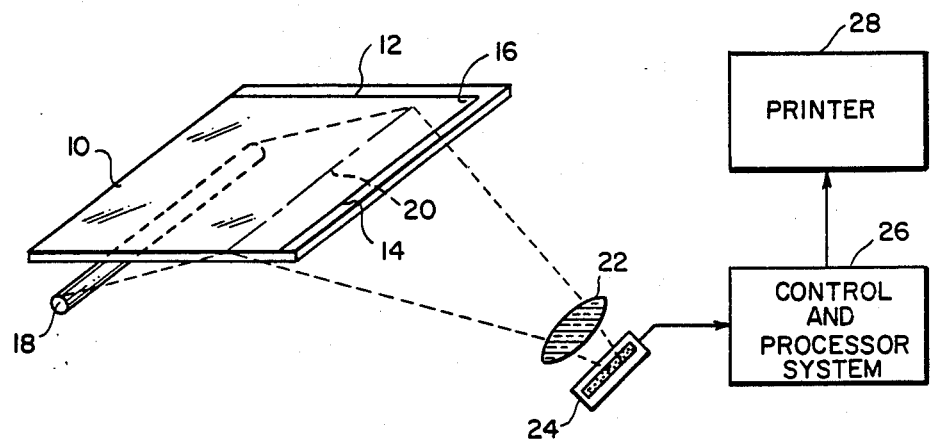
FIG. 1 is a schematic view of the copy machine components required to calibrate platen registration edges.

Throughout the following description, similar reference characters refer to similar elements or members in all of the figures of the drawing.

Referring now to the drawing, and to FIG. 1 in particular, there is shown the major components of a copying machine which are utilized in the registration location process described in this invention. The platen 10 is a transparent, flat member which is positioned in the copy machine for placement of the original document thereon. Registration marks, lines, or guides are positioned at two of the corners of the platen 10, as shown by the marks 12 and 14. Pages of documents to be duplicated or copied are placed at the upper right hand corner 16 of the platen against or aligned with the registration marks 12 and 14.

The apparatus for scanning the original document located on the platen can take many different forms, with the arrangement shown in FIG. 1 representing the preferred embodiment of the invention. In this embodiment, the illuminating source 18 directs a narrow beam of light on the underside of the platen 10. The beam of light, denoted by line 20, illuminates a one-line portion of the document being scanned. Reflected light from the scanned document is transferred through the lense 22 to the detector 24, which can be a charge coupled device (CCD). The linear CCD 24 is capable of measuring the reflected light intensity, or density, from an entire line on the document scan. The number of pixels contained in the CCD 24 determine the resolution of the image content contained within the scanned line. A CCD suitable for use in high resolution copying apparatus could have a pixel count of 5,000.

In order to scan the entire page, the illuminating source 18 must be moved across the plate 10 such that the illuminated line 20 and the resulting optically focused line on the CCD 24 travels across the width of the page being copied or duplicated. Although in this embodiment the scanning takes place by keeping the lense and CCD 24 stationary and moving the illuminating source 18, other arrangements may be used to scan the document area, such as moving the platen on which the document is placed, or using a more generalized light source and moving the CCD 24 with respect to the platen 10. Whatever the arrangement used, the result is basically the same in that the original document is scanned one line at a time, with each line containing a number of pixels which resolve the content of each line down into finer and smaller areas. Once the signal from the CCD 24 is acquired, the data is applied to the control and processor system 26 which appropriately manipulates the data and stores it for later use and for use by the printer 28, in a manner well known in the prior art.

Figure 2:
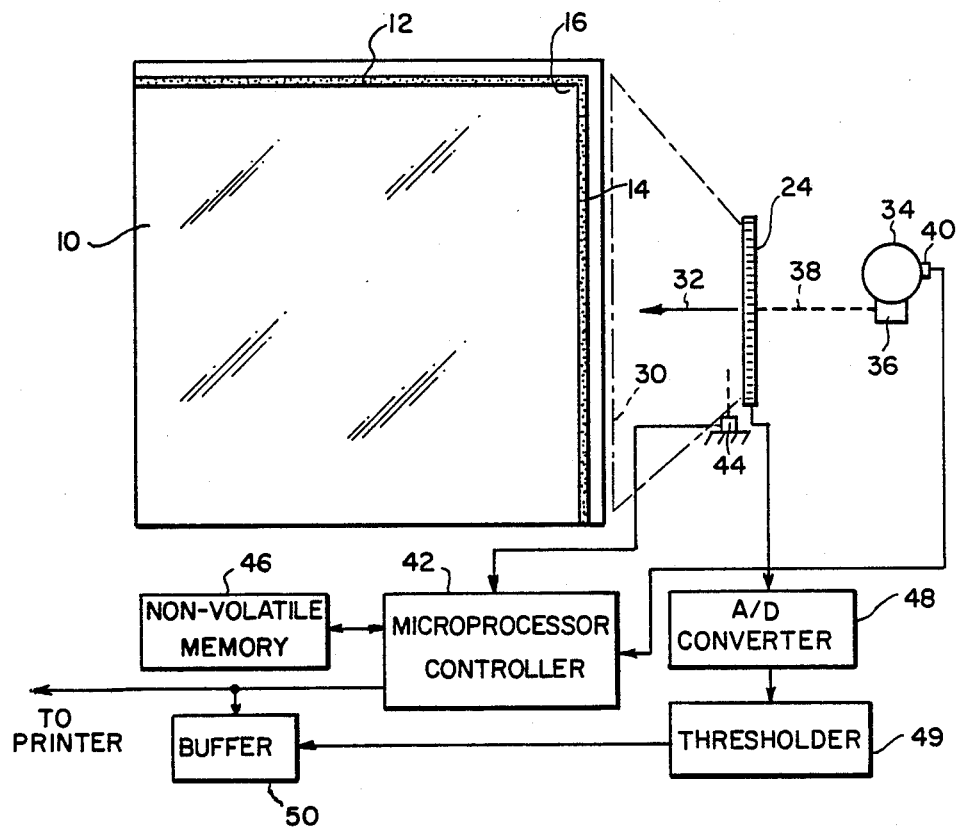
FIG. 2 is a detailed view of a platen and the associated electronic and optical support devices.

FIG. 2 is a detailed view of a platen and the associated electronic and optical support devices needed to implement the invention. The transparent platen 10 includes the intrack calibration line 12 and the cross-track calibration line 14 which are similar to the marks 12 and 14 shown in FIG. 1. In some cases, the lines 12 and 14 can be used for additional purposes, such as calibrating the response of the light and CCD system for consistent response over the entire platen area. In any event, the lines 12 and 14 are to be used to align the original document page on the platen so that it will be scanned properly and at the correct location.

In some apparatus, the lines 12 and 14 may actually be thick strips of material attached to the platen surface so that the original page can be pushed up into the corner 16 against the material strips to aid in alignment of the document on the platen 10. Whatever the makeup or composition of the lines 12 and 14, the effect is to present a fixed surface on the platen 10 which has a different color for creating different density reflections when the scanner passes underneath these platen registration areas. The different densities reflected by the lines aids and permits the location of these lines with respect to the physical position of the platen 10. The terms lines, marks, guides, etc., should be regarded as synonymous herein.

The charge coupled device (CCD) 24 receives light from the scan line 30 due to the illumination of the platen region by an illuminating source which is not illustrated in FIG. 2. For simplicity of illustration, it will be assumed that the scanning of the platen area is accomplished by moving the CCD 24 in the direction 32 across the platen 10, thereby moving the scan line 30 across the registration lines 12 and 14 and across the platen surface. It is again emphasized that the actual method used to scan the platen area may be different than that used for the illustration of FIG. 2, including the use of a fixed CCD and a moving illuminating source.

Calibration of the registration lines is required when the platen has been moved with respect to the other optical and mechanical components of the scanning system. During the calibration process, the platen is left blank, that is, without any document page positioned on the platen near the registration lines 12 and 14. The platen cover is also left open. Under such conditions, the regions of the platen not covered with the registration lines 12 and 14 appear to be dark, high density areas and are recognized as such by the CCD 24. However, the lines 12 and 14, being of a light colored material, at least on the underside which is exposed to the CCD 24, exhibit a low density, or light area when detected by the CCD 24. It is the contrast or difference between the density areas of the lines 12 and 14 and the other platen area which is utilized to determine the edges of the registration lines whereat the original document page will be aligned.

During the calibration process, the CCD 24, in this embodiment, moves in direction 32 to move the scan line 30 across the platen area. Movement of the CCD 24 is provided by the motor 34 and the gearing mechanism 36, which are coupled to the CCD 24 as indicated by line 38. An encoder 40, which can be any form of device for counting the number of revolutions of the motor, is positioned to feed encoder or revolution pulses to the microprocessor controller 42. Thus, the controller 42 is able to know the exact mechanical position of the CCD 24 as line 30 scans across the platen area.

A fixed reference point is provided by the sensor 44 which can be an optical or mechanical sensor which detects the movement of the CCD 24 as it starts its scanning motion across platen 10. During the operation of the calibration process, the motor 34 starts the CCD 24 moving in the direction 32 from the position shown in FIG. 2. Once the CCD 24 activates the sensor 44, a reference point for future use is stored by the microprocessor controller 42 into the non-volatile memory 46. Lines of data are then scanned by the CCD 24 and applied to the A/D converter 48. While the scanning operation takes place, the encoder 40 supplies data to the microprocessor controller 42 so that the location of any information from a particular line scan can be determined accurately with respect to the location of the fixed sensor 44.

As the scanning line 30 moves in direction 32 across the platen area, it first receives reflected light from the platen area from the bottom of the registration line 14. Because of the light colored aspects of line 14, this reflected light has a low density and is appropriately stored in the buffer 50. The "density" of the light refers to the nature of the light from an image area of known density. A high density light comes from a dense toner or black area. A low density light comes from a white area. "Density" in this description is different than "intensity" which could refer to the amount of reflected light. Continuing the scan, a point is reached where the scan line 30 is at the left edge of registration line 14 which marks the position at which the location is to be determined. At this transition, the density of the light reflected to the CCD 24 increases to a high amount because of the relatively black or dark image presented by the empty platen 10 with its cover open. This data is also stored in buffer 50 and additional data is stored in buffer 50 for a slight distance past the edge of line 14 so that enough data can be obtained to accurately locate the line edge within a predetermined tolerance of possible line edge locations.

In addition to the scanning for the edge of the line 14, the scanning for the edge of line 12 is also accomplished during the same scanning operation. Line 30 overlaps the line 12 so that the pixels of the CCD corresponding to the area occupied by the light colored line 12 receive a low density light signal, and the pixels corresponding to the open platen area below the edge of line 12 receive high density data signals. The signals are also taken over a sample area and stored in the memory buffer 50. Once the initial process of scanning the empty platen is accomplished after a service routine or after some other event which might change the location of the registration edges with respect to a fixed location, the data is then processed and the locations of the registration edges, equated to encoder pulses from the fixed reference point, are stored in the non-volatile memory 46 for use during a normal scanning operation.

FIG. 3 is an enlarged partial view of the upper right hand corner of the platen shown in FIG. 2. According to FIG. 3, the registration lines 12 and 14 are shown intersecting each other at region 54 and extending perpendicularly along the platen edges 56 and 58. The area inside the box 60 is used to determine the location of the intrack registration edge 15. Even though the scanning of the lines which progress across the platen 10 during the calibration process stores data for a bigger area than that bounded by the box 60, the process by which the data is analyzed and processed to determine where the edge of line 14 is located needs only examine the data within box 60. Box 60 is sufficiently large that, regardless of the mismatch of the platen and CCD devices, the region within box 60 is always large enough to encompass the location of the edge 15 of line 14. Similar reasoning applies to the box 62 which surrounds the data which needs to be processed to locate the crosstrack registration edge 13 of the line 12. The thickness of the lines 12 and 14 is not critical to the operation of this invention. Any thickness greater than a minimum recognizable thickness may be used. A thickness of one-sixteenth inch is considered adequate.

FIG. 4 is a graph illustrating the operation of the thresholder 49 shown in FIG. 2. The multi-bit digital voltage which is applied to the thresholder is represented by curve 64. When the CCD is looking at a low density area, the voltage of curve 64 has a relatively high value, $V_1$. When the transition edge is being approached, the voltage of curve 64 starts to reduce and eventually acquires the lower level indicated of $V_2$. The threshold level, indicated by line 66, determines when the decrease in the signal voltage changes the output from a single-bit binary high to a binary low. In the example shown in FIG. 4, this transition occurs at location 68 and is graphically represented by the curve 70.

FIG. 5 is a flow chart of a software algorithm used to determine the location of the registration edges during the calibration process. According to FIG. 5, the process is started without any document located on the platen. Block 72 represents the start, and blocks 74 and 76 indicate the activation of the scanner motion and a detection of the transition from low to high density during a line scan. When this transition occurs, the location at which it occurs is stored in memory, according to block 78. Thus, the location of the intrack registration edge 15, as shown in FIG. 3, is recorded in non-volatile memory for use later by the apparatus. Blocks 80, 82 and 84 illustrate the algorithm operation to detect a transition from low to high density in the pixels of a line scan. Once determined, the location of the crosstrack registration edge 13, as shown in FIG. 3, is stored into non-volatile memory for future use. It is emphasized that the flow chart illustrated in FIG. 5 is one of several which may be used to determine, from memory data acquired during the initial scanning process, the location where the transition occurs from low to high density. Other algorithms substantially accomplishing the same result could be used and would be apparent from those skilled in the art of writing computer software.

FIG. 6 is a flow chart of an algorithm which may be used to scan document pages after the calibration process has stored the location of the registration edges into memory. By using the algorithm in FIG. 6, extraneous and redundant memory data can be avoided, and the orientation of the original document displayed on the reproduced copy should be accurately aligned. According to blocks 86, 88 and 90, the scanner motion is activated or started and, when the position of the scanner is located exactly at the location previously stored for the location of the registration edges, the data on the document to be duplicated is scanned and placed into memory, as indicated by block 92. When the scan is complete, that is, when the complete page has been scanned, digitized, and placed into memory, the scanning process is complete as shown by blocks 94 and 96. Ordinarily, a scan is known to be complete when the travel of the scanner has been sufficient to encompass the complete dimensions of the paper being duplicated.

There has been disclosed herein a new and unique system for easily and rapidly determining the location of the registration edges on the platen of copying apparatus. The calibration process would normally take place at any time when the previously stored location values would not be accurate, such as after maintenance on the apparatus. Since additional hardware and/or alignment tools are not necessary to perform this calibration process, the use thereof is very helpful in maintaining electrophotographic copying and duplicating machines in calibration and adjustment for making accurate copies thereon.

It is emphasized that numerous changes may be made in the above-described apparatus without departing from the teachings of the invention. It is intended that all of the matter contained in the foregoing description, or shown in the accompanying drawing, shall be interpreted as illustrative, rather than limiting.

We claim as our invention:

1. An electrophotographic copier having a calibrated scanning system for converting the image content of an original document into digitized signals, said scanning system comprising:
   a platen onto which the original document may be placed, said platen having registration guides thereon;
   means for scanning the platen to detect a change in the density of image information from the platen area;

means for processing the change in density to locate the registration guides on the platen;

means for storing the location of the registration guides with respect to a fixed location for subsequent retrieval, said fixed location being separated from the platen; and means for subsequently storing document signals when the scanning system effectively moves past the stored location of the registration guides.

2. The copier of claim 1 wherein the registration guides on the platen are light colored to be distinguishable from a high density area.

3. The copier of claim 1 wherein the registration guides include two intersecting elongated surfaces extending perpendicularly to each other along two separate edges of the platen.

4. The copier of claim 3 wherein the registration guides have a width which is greater than one-sixteenth inch.

5. The copier of claim 1 wherein the means for scanning includes a linear charge coupled device which is optically coupled to light reflected from the platen area.

6. The copier of claim 5 wherein the means for scanning includes circuitry to detect when the signal from the charge coupled device exceeds a predetermined threshold value.

7. The copier of claim 1 wherein the processing means includes a microprocessor which is controlled with a program to determine when a detected change of density is produced at the edges of the registration guides where the original document is to be aligned.

8. The copier of claim 1 wherein the storing means includes a non-volatile digital memory, and wherein said fixed location is referenced to the physical movement of the scanner with respect to the platen.

9. The copier of claim 1 wherein the means for beginning the storage includes a microprocessor which is controlled with a program to recall the location of the registration marks from storage.

10. An electrophotographic copier having a calibrated scanning system for converting the image content of an original document into digitized signals, said scanning system comprising:

a platen onto which the original document may be placed, said platen having a first light colored line extending along one edge of the platen and a second light colored line extending along another edge of the platen and perpendicular to said first line;

a linear charge coupled device (CCD) which is optically coupled to focused light reflected from the platen area, said CCD being aligned such that the linear dimension of the CCD is parallel with said first line;

processing means which uses reflected light density for determining the location of the edges of the lines where the original document is to be aligned;

memory means for storing the locations of the line edges, said line locations being referenced to a fixed location which is separate from the platen and indicative of the physical position of the scanner with respect to the platen; and control means for beginning the storage of digitized document signals immediately after the scanning system moves past the area of the platen which is within the stored location of the line edges.

11. The copier of claim 10 wherein the first and second lines have a width which is greater than one-sixteenth inch.

12. The copier of claim 10 wherein the scan line at which the density abruptly changes determines the location of the first line edge.

13. The copier of claim 10 wherein the CCD pixel at which the density abruptly changes determines the location of the second line edge.

14. A method of calibrating a document scanner which locates the registration guides on the platen of an electrophotographic copier, said method including the steps of:

scanning the platen area, without a document or cover located thereon, with a charge coupled device (CCD);

determining, from data obtained during said scanning, the location of abrupt density changes between light colored lines located on the platen and the remaining platen background;

referencing the relative position of the scanning apparatus and the platen to a fixed location which is separate from the platen;

storing the determined locations in memory; and utilizing the stored locations to define the only area of the platen from which image data of an original document is scanned and stored.

15. The method of claim 14 including the step of sensing when the signals from the CCD exceed a predetermined threshold level.

16. The method of claim 14 wherein said lines include first and second lines which extend along the edges of the platen and are perpendicular to each other.

* * * * *